US010370157B2

(12) United States Patent
Gonzalez Valencia et al.

(10) Patent No.: US 10,370,157 B2
(45) Date of Patent: Aug. 6, 2019

(54) SELF-EXTRACTING CAP

(71) Applicant: TAPOINTEL S.L., A Coruna (ES)

(72) Inventors: Juan Gonzalez Valencia, Valencia (ES); Jose Andres Vidal Martinez, La Coruna (ES); Jose Gomez Vietes, La Coruna (ES); Jesus Vidal Iglesias, La Coruna (ES); Julio David Vidal Iglesias, La Coruna (ES)

(73) Assignee: TAPOINTEL S.L., A Coruna (ES)

( * ) Notice: Subject to any disclaimer, the term of this patent is extended or adjusted under 35 U.S.C. 154(b) by 31 days.

(21) Appl. No.: 15/512,106

(22) PCT Filed: Aug. 6, 2015

(86) PCT No.: PCT/ES2015/000105
§ 371 (c)(1),
(2) Date: Mar. 17, 2017

(87) PCT Pub. No.: WO2016/046424
PCT Pub. Date: Mar. 31, 2016

(65) Prior Publication Data
US 2017/0275057 A1    Sep. 28, 2017

(30) Foreign Application Priority Data

Sep. 22, 2014 (ES) .................... 201400765

(51) Int. Cl.
*B67B 1/04* (2006.01)
*B67B 7/06* (2006.01)
(Continued)

(52) U.S. Cl.
CPC ............. *B65D 39/12* (2013.01); *B65D 39/16* (2013.01); *B67B 1/04* (2013.01); *B67B 7/06* (2013.01); *Y02W 30/807* (2015.05)

(58) Field of Classification Search
CPC .......... B65D 39/12; B65D 39/16; B67B 1/04; B67B 7/06; Y02W 30/807
(Continued)

(56) References Cited

FOREIGN PATENT DOCUMENTS

| DE | 102006043003 A1 | * | 3/2008 | ............. B65D 39/16 |
| DE | 202011005544 U1 | * | 10/2011 | ............. B65D 39/12 |
| EP | 1184295 | | 3/2002 | |

OTHER PUBLICATIONS

International Search Report, PCT/ES2015/000105, dated Feb. 8, 2016.

* cited by examiner

*Primary Examiner* — James N Smalley
(74) *Attorney, Agent, or Firm* — Porzio Bromberg & Newman

(57) ABSTRACT

The invention relates to a self-extracting stopper which can be accommodated inside the neck of the bottle, and which does not require a corkscrew or any other tool for the extraction thereof, formed by an assembly of parts preferably made of a plastic material and which, once assembled, permit a bottle or container to be stoppered. The face of the drum (8) and the surface of revolution of the flexible cylinder (4) can also carry marks that are engraved or in shallow relief. In this way, the assembly of the self-extracting stopper is formed by six elements and a cork cover (1), a nut (2), a flexible cylinder (5), a drum (8), a screw (12) and a wing nut (15), all of which are disposed and assembled according to their axial geometry, and which permit a method and process to be provided whereby bottles and/or containers can be stoppered or opened manually or automatically, and said self-extracting stopper being reusable.

4 Claims, 1 Drawing Sheet

(51) Int. Cl.
*B65D 39/12* (2006.01)
*B65D 39/16* (2006.01)

(58) Field of Classification Search
USPC .......................................................... 215/364
See application file for complete search history.

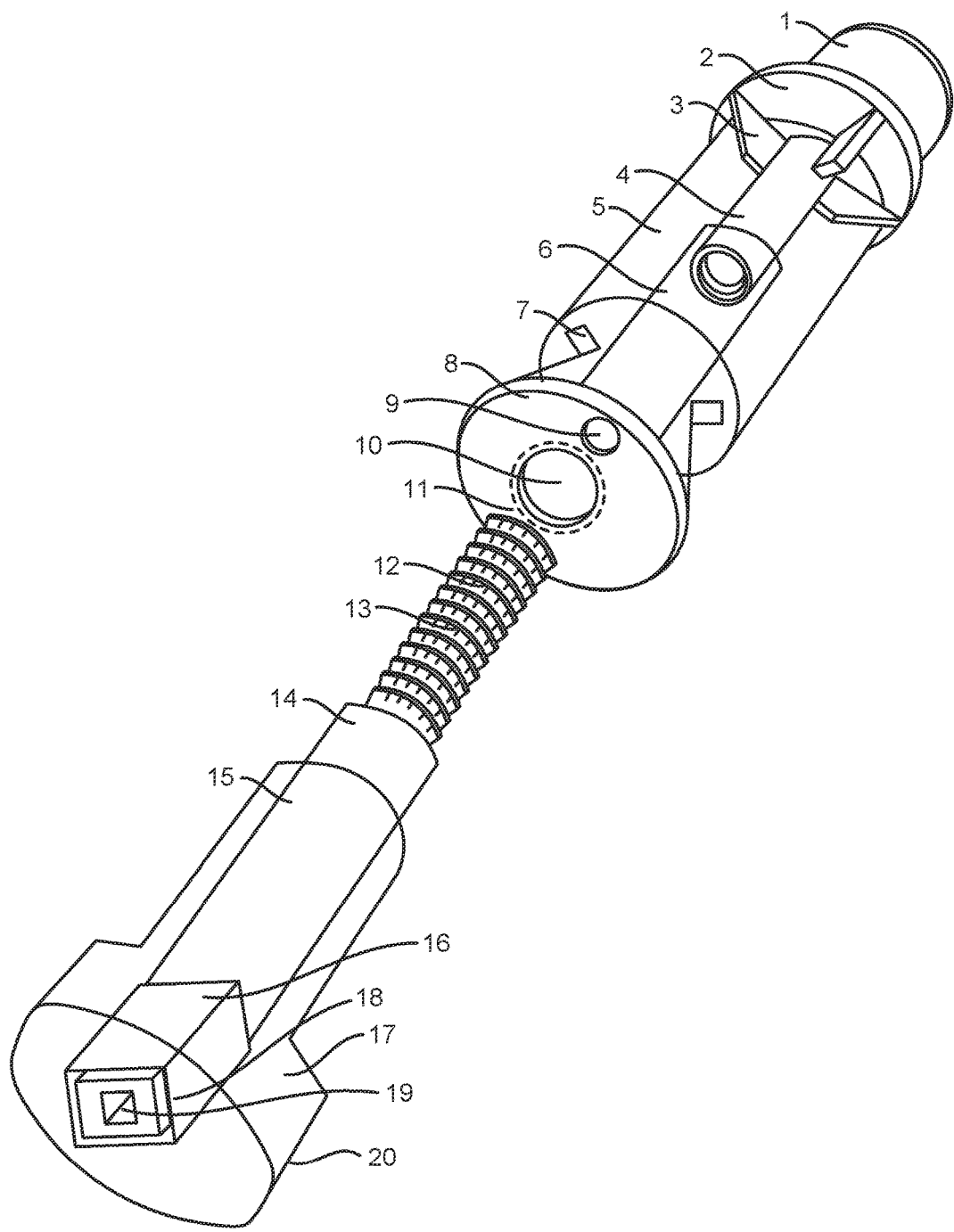

SELF-EXTRACTING CAP

PURPOSE OF THE INVENTION

The invention included in the scope of this application and the design brief consists of a self-extracting cap as an opening and closing procedure of bottles and containers for liquids or fluids.

Mastery of this technique and the industrial application field are included in the sector of reusable caps that do not require instruments or tools to remove or introduce them into the containers and bottles openings, as they can simply be removed by hand.

BACKGROUND OF THE INVENTION

According to state of the art analysis, no other product has identical or even similar features.

Thus, the purpose of the invention offers key advantages for its application, not covered by other similar or alternative means.

The self-extracting cap allows liquid or fluid bottles and containers to be capped without the need for corkscrews or any other tool.

With only the strength of the hand, and more specifically, the thumb and index finger making small turns in the wing nut included, it can be extracted from the bottleneck where it is installed, and replaced again, following the same steps in reverse order.

The seal achieved with the self-extracting cap also allows for a better preservation of the bottle content, preventing it from oxidising due to air entry, but when required, the interior of the container can also be oxygenated using optional devices on the cap itself.

According to the inventor, an expert in this area, the purpose of the invention constitutes an important innovation that, due to its qualities and advantages, has an evident industrial and commercial interest.

DESCRIPTION OF THE INVENTION

The self-extracting cap consists of a set of parts, each with a different role and all of them working for a unique result: opening and closing bottles and containers for liquids or fluids.

A moving wing nut, of which the diameter of the wings does not exceed the bore of the bottleneck, can be extracted from it by sliding it over a square head screw, which can be extracted by rotating the wing nut.

This square head screw has, before the screw coils, a cylindrical male that rests on a drum, through which the screw coils' axis is introduced until it reaches a nut sealed by a cork cover.

Between the drum and the nut, a cylinder made of flexible material allows, through aspiration between the drum and the nut, to be compressed and expanded towards the outside, closing the bottleneck.

Once the operation is carried out, the wing nut is pushed in and the entire set remains inside the bottleneck, flush with its opening.

Moreover, the invention is intended to be convenient and easy to use and similarly, its removal or disposal is also easy and convenient, causing no harm to the environment.

To complement the description below and in order to gain a better understanding of the features of the invention, the following design brief includes a drawing sheet which facilitates understanding of the innovations and advantages of the device included in this invention.

BRIEF DESCRIPTION OF THE DRAWINGS

In order to understand the range of features and advantages of the purpose of the invention, the model, application and brief includes a drawing that complements the description of a preferred mode of execution that will be carried out next, the content of which is not limiting but merely illustrative.

FIG. 1 shows the entire set, and the inner lines of the parts in the hidden devices are shown using slides.

FIG. 1
(1) CORK COVER
(2) NUT
(3) FIN
(4) NECK OF THE NUT
(5) FLEXIBLE CYLINDER
(6) DRUM GUIDE NECK
(7) DRUM WINGS FITTINGS
(8) DRUM
(9) ANTI-ROTATION FITTING
(10) DRUM HOLE
(11) TREAD AREA OF THE MALE SCREW
(12) SCREW
(13) GROOVES
(14) MALE
(15) WING NUT
(16) SQUARE HEAD
(17) WING NUT FIN
(18) SQUARED WING NUT FITTING
(19) SCREW SQUARE HOLE
(20) WING NUT TAB

DESCRIPTION OF PREFERRED MODE OF EXECUTION

FIG. 1. The self-extracting cap is sealed on the side touching the liquid, with a cork cover (1) welded to the nut (2) which has radially distributed anti-rotation fins (3) resting on the neck of the nut (4).

The flexible cylinder (5) has holes for the nut (2) fins (3) to prevent the nut from rotating when introducing the screw (12).

The flexible cylinder (5) is axially perforated to allow the drum guide neck (6) and its wings into the drum wings' fittings (7).

The drum (8) has two opposing anti-rotation fittings (9) to prevent the drum (8) from rotating when the flexible cylinder (5) expands inside the bottleneck.

In turn, the drum (8) has a central hole, drum hole (10) for the screw to get through (12) and around the drum hole (10) there is a tread area, tread area of the male screw (14) where it rests and the whole screw does not get through, (12) thus causing the nut (2) to compress the flexible cylinder (5).

The screw (12) in turn has grooves in its coils, (13) and on the series of coils, a cylindrical male (14) which ends in a hollow square head (16) with screw square hollow (19).

The wing nut (15) equipped with protrusions, fins of the wing nut (17) upon which to rest the fingers: thumb and index and make it turn, has a square shaped hollow inside it, as a squared wing nut fitting (18) for the square head (16) of the screw, which extends along the entire wing nut (15).

The invention claimed is:

1. A self-extracting cap for opening and closing a bottle or container comprising: a cork cover sealed on a nut, a flexible cylinder positioned between the nut and a drum, the drum has a central hole for a screw to get through, a wing nut slidably received over the screw, the screw rotates by turning and fastening of the wing nut, the nut has fins attached to a neck of the nut;

the flexible cylinder has an axial inner hole and on both sides for the nut and drum wings fittings to prevent the nut from rotating when introducing the screw; the drum has anti-rotation fittings on a first side and a drum guide neck on a second side, wings being incorporated radially on the drum guide neck;

the screw has a first section of grooves and a second section of a flat and cylindrical male an end of the cylindrical male ends in a square head; the square head having a screw square hole, the male screw including a tread area aligned with the drum hole to prevent the male screw from getting through the drum hole; and the wing nut has wing nut fins, a squared wing nut fitting and a tab run inside and along an axis to withdraw the wing nut from the bottle or container, wherein turning of the wing nut aspirates the flexible cylinder when pressed between the nut and the drum to expand the flexible cylinder towards walls of the bottle or container for putting pressure on the walls of the bottle or container closing a neck of the bottle or container.

2. The self-extracting cap in accordance with claim 1, wherein the cork cover is perforated on a central part wherein oxygen can get inside the bottle or container.

3. The self-extracting cap according to claim 1, wherein the screw is screwed onto the nut by turning the screw to the right and by means of the wing nut, the square wing nut fitting rotates the screw on the square head of the screw.

4. The self-extracting cap according to claim 1, wherein the wing nut slides on the screw to at least two positions: a first position having the wing nut lowered to a height of the cylindrical male in a transport position of the bottle or container and a second position sliding to the wing nut to a top so that the wing nut fins are outside the neck and rotate out of the neck so the bottle or container can be opened by decompressing the flexible cylinder by turning the screw counter-clockwise.

* * * * *